(12) United States Patent
Metros et al.

(10) Patent No.: US 7,635,210 B2
(45) Date of Patent: Dec. 22, 2009

(54) ILLUMINATED DOOR HANDLE

(75) Inventors: Craig Metros, Bloomfield, MI (US); Dave Lechkun, Shelby Township, MI (US); Jeff Nowak, Huntington Woods, MI (US); Michael Smith, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 290 days.

(21) Appl. No.: 11/615,693

(22) Filed: Dec. 22, 2006

(65) Prior Publication Data

US 2007/0195542 A1 Aug. 23, 2007

Related U.S. Application Data

(60) Provisional application No. 60/753,742, filed on Dec. 23, 2005.

(51) Int. Cl.
*B60Q 1/00* (2006.01)

(52) U.S. Cl. .................. 362/501; 362/540; 362/511; 296/146.1

(58) Field of Classification Search .................. 362/501, 362/100, 511, 540, 605, 488; 16/110.1, 412–414; 296/146.1, 1.02, 152
See application file for complete search history.

(56) References Cited

U.S. PATENT DOCUMENTS

| | | | |
|---|---|---|---|
| 5,581,230 A | 12/1996 | Barrett | |
| 6,070,998 A * | 6/2000 | Jennings et al. | 362/501 |
| 6,164,805 A * | 12/2000 | Hulse | 362/501 |
| D446,438 S | 8/2001 | Ciaramitaro et al. | |
| 6,273,579 B1 | 8/2001 | Holloway | |
| 6,349,450 B1 * | 2/2002 | Koops et al. | 292/336.3 |
| 6,523,888 B1 * | 2/2003 | Yan et al. | 296/215 |
| 6,561,667 B2 * | 5/2003 | Stapf | 362/84 |
| 6,577,228 B1 * | 6/2003 | Tsuchida et al. | 340/5.72 |
| 6,793,385 B2 * | 9/2004 | Tiesler et al. | 362/501 |
| 6,848,818 B2 * | 2/2005 | Huizenga | 362/501 |
| 7,055,997 B2 * | 6/2006 | Baek | 362/501 |
| 7,104,675 B2 * | 9/2006 | Chen | 362/490 |
| 7,244,054 B2 * | 7/2007 | Chou | 362/501 |
| 7,261,446 B2 * | 8/2007 | Thomas | 362/459 |
| 7,270,452 B2 * | 9/2007 | Wang | 362/501 |

* cited by examiner

*Primary Examiner*—Gunyoung T Lee
(74) *Attorney, Agent, or Firm*—Dickinson Wright PLLC; Greg Brown

(57) ABSTRACT

An illuminated door handle (16) for a vehicle door (12,14) includes a mounting frame (22), a handle arm (24), an LED (26), an LED light guide (28), and a back plate (30). The handle arm (24) is pivotally attached to the mounting frame (22). The handle arm (24) includes one or more window portions (32) and a cavity (34), with the LED light guide (28) extending into the cavity (34) and emitting light through the window portion (32). The back plate (30) is attached to the handle arm (24) and extends across the cavity (34). The LED (26) is attached to the LED light guide (28) and transmits light through the LED light guide (28).

3 Claims, 3 Drawing Sheets

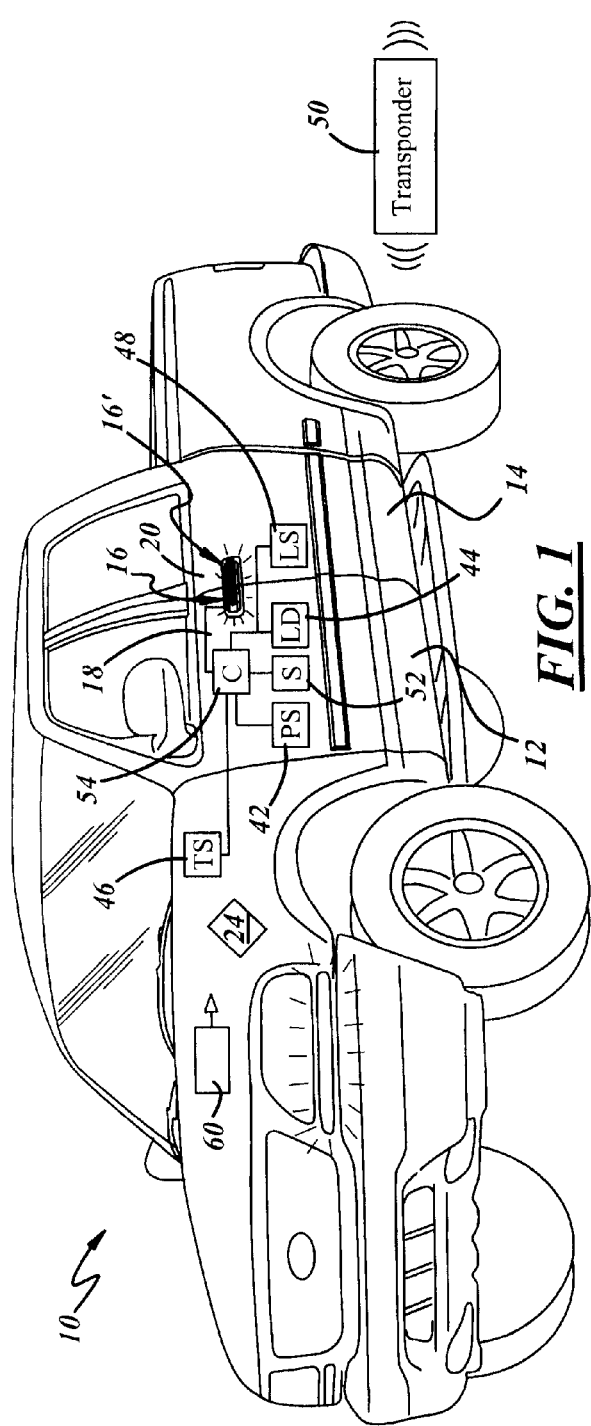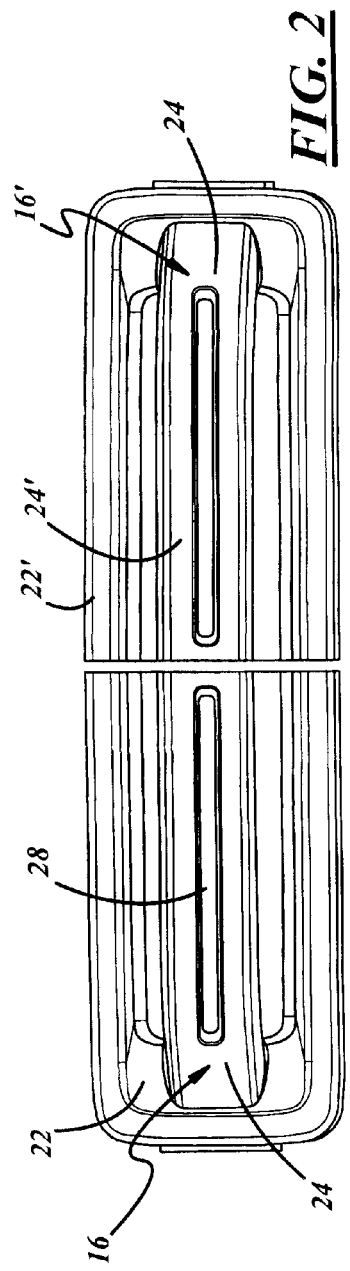

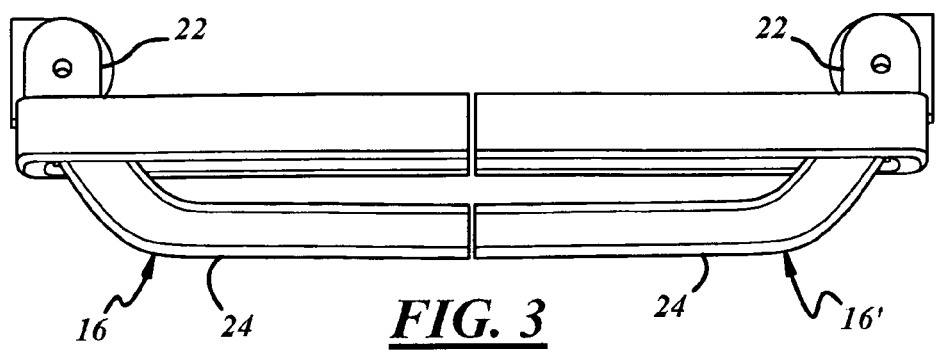
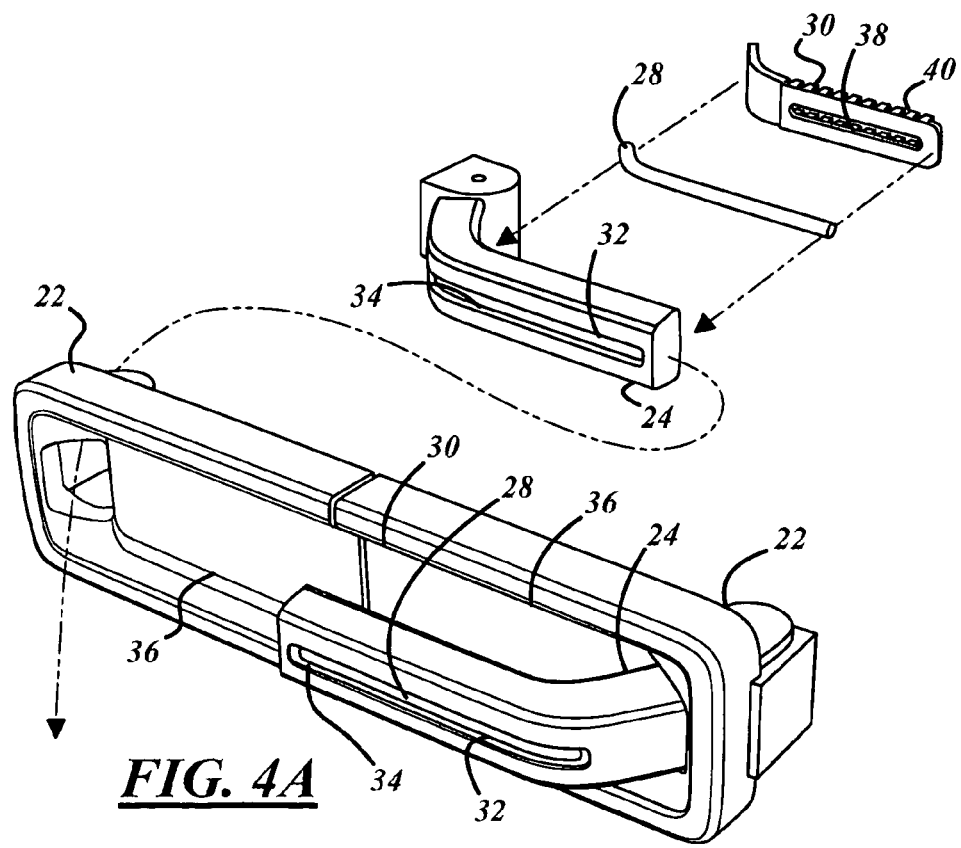

ILLUMINATED DOOR HANDLE

CROSS-REFERENCE TO RELATED APPLICATION

This application claims the benefit of prior U.S. Provisional Application Ser. No. 60/753,742, filed on Dec. 23, 2005.

TECHNICAL FIELD

The present invention relates generally to vehicle door handles, and more particularly to an illuminated door handle system indicating a variety of vehicle conditions and improving visibility of the vehicle.

BACKGROUND

Auto manufacturers are investigating exterior vehicle lighting for enhancing the convenience of accessing a vehicle in dimly lit conditions. For instance, one known vehicle includes a pair of side view mirror assemblies having a light source that illuminates the vehicle's surroundings, such as when the doors are unlocked by a remote key fob. In this way, the vehicle can be readily found in a large overcrowded parking lot. It will also be appreciated that providing light can enhance the safety of a driver approaching the vehicle.

Auto manufacturers are also developing various exterior vehicle lighting systems for indicating a variety of vehicle conditions. One example is a vehicle with front headlamp assemblies with a light source that emits light to indicate when the engine of the vehicle is running.

Conventional vehicles include door handles without any light source, which can be difficult to find in poorly lit conditions.

It is therefore desirable to provide an illuminated door handle for a vehicle that enhances convenience in opening a vehicle door and indicates a variety of vehicle conditions.

SUMMARY OF THE INVENTION

An illuminated door handle for a vehicle door includes a mounting frame, a handle arm, an LED, an LED light guide, and a back plate. The handle arm is pivotally attached to the mounting frame. The handle arm includes one or more window portions and a cavity, with the LED light guide extending into the cavity and emitting light through the window portion. The back plate is attached to the handle arm and extends across the cavity. The LED is attached to the LED light guide and transmits light through the LED light guide.

One advantage of the invention is that an illuminated door handle is provided that facilitates a person in finding the door handle in poorly lit conditions.

Another advantage of the invention is that an illuminated door handle is provided that can signal a variety of vehicle conditions.

Yet another advantage of the invention is that an illuminated door handle is provided that has enhanced comfort and grip for opening a vehicle door.

Other advantages of the present invention will become apparent upon considering the following detailed description and appended claims, and upon reference to the accompanying drawings.

BRIEF DESCRIPTION OF THE DRAWINGS

For a more complete understanding of this invention, reference should now be made to the embodiments illustrated in greater detail in the accompanying drawings and described below by way of the examples of the invention:

FIG. 1 is a perspective view of a vehicle having a first row door and a second row door, each with an illuminated door handle, according to one embodiment of the invention;

FIG. 2 is an outboard side view of the two illuminated door handles shown in FIG. 1;

FIG. 3 is a top view of the two illuminated door handles shown in FIG. 1;

FIG. 4A is an outboard side exploded view of one of the illuminated door handles shown in FIG. 1;

DETAILED DESCRIPTION OF THE INVENTION

Figure 4B:
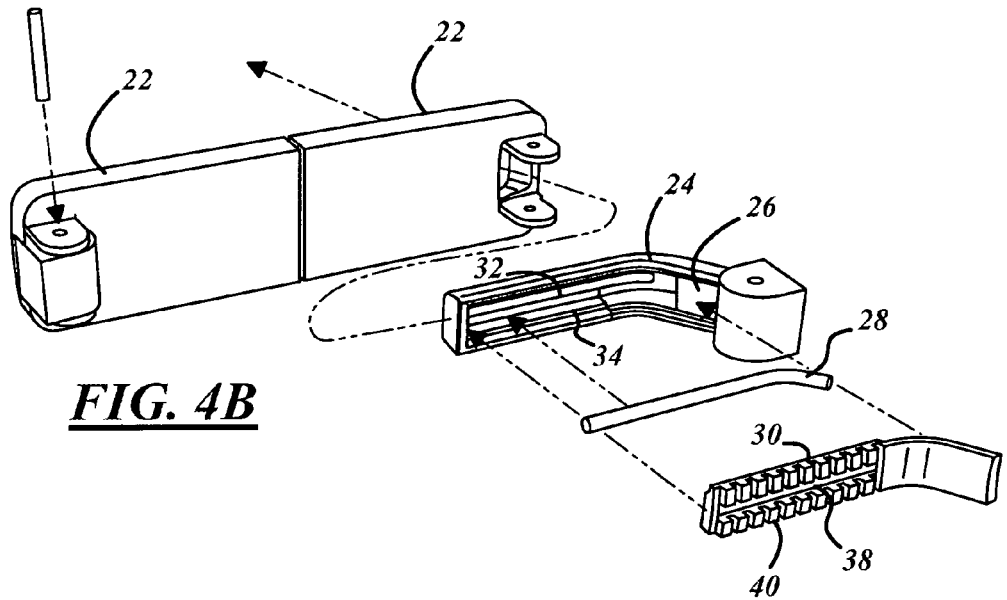
FIG. 4B is an inboard side exploded view of one of the illuminated door handles shown in FIG. 1.

In the following figures, the same reference numerals are used to identify the same components in the various views.

Referring to FIG. 1, there is shown a front perspective view of a vehicle 10 having a first row door 12 and a second row door 14, each with an illuminated door handle 16, 16' ("door handle"), according to one embodiment of the claimed invention. It will be appreciated that two first row doors 12 and two second row doors 14 are attached to opposing sides of the vehicle 10. However, for illustrative purposes only, FIG. 1 only shows one side of the vehicle 10 with one first row door 12 and one second row door 14. As detailed below, the door handle 16 is beneficial for indicating a variety of vehicle conditions and facilitating a person in opening the doors 12, 14.

As shown in FIGS. 1 through 3, first row door 12 has a rear portion 18 with door handle 16 positioned in a first orientation. Second row door 14 has a forward portion 20 with door handle 16' in a second orientation diametrically opposed to the first orientation of the door handle 16 on the first row door 12. In this regard, the second row door 14 pivots outboard in the opposite direction of the first row door 12. It is contemplated that more or less than four door handles 16, 16' can be attached to a variety of suitable portions of the vehicle 10.

With attention to FIGS. 2, 3, 4A and 4B, each door handle 16, 16' includes a mounting frame 22, a handle arm 24, an LED 26, an LED light guide 28, and a back plate 30 (best shown in FIGS. 4A and 4B). The handle arm 24 is pivotally attached to the mounting frame 22. The handle arm 24 includes one or more window portions 32 and a cavity 34 (best shown in FIG. 4B). The LED light guide 28 extends into the cavity 34 and emits light through the window portion 32. The back plate 30 is attached to the handle arm 24 and extends across the cavity 34. The LED 26 is attached to the LED light guide 28 and Transmits light through the LED light guide 28.

Figure 5:
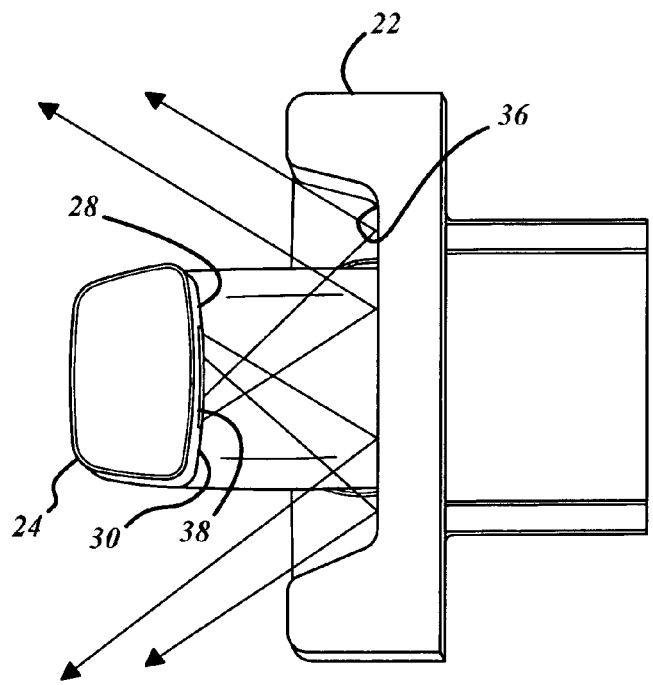
FIG. 5 is a rear end view of one of the illuminated door handles shown in FIG. 1.

Referring to FIG. 5, the mounting frame 22 has an outboard surface 36 for reflecting light outboard from the LED light guide 28. In the illustrated embodiment, the outboard surface 36 is formed from bright plated material, such as chrome, with a substantially high index of reflection. However, it is contemplated that the outboard surface 36 can be formed from various other suitable materials as styling dictates. The back plate 30 includes one or more light ports 38 (shown in FIGS. 4A and 4B) for transmitting light from the LED light guide to the outboard surface 36 of the mounting frame 22.

As best shown in FIG. 4B, the back plate 30 is formed from rubber with an uneven textured surface 40 for enhancing comfort and friction of grip. It is understood that back plate 30 can be otherwise textured and be formed from other suitable materials.

With attention to FIG. 1, the vehicle 10 includes a passive entry system 42, a door lock system 44, a turning signal system 46, and a running light system 48, each with the illuminated door handles 16, 16'. In this embodiment, the LED 26 is a multicolor LED emitting a series of colors for indicating a variety of vehicle conditions.

The passive entry system 42 includes a transponder 50, a proximity sensor 52, a controller 54, and the door handles 16. The transponder 50 is carried by a vehicle occupant. The proximity sensor 52 is integrated within the vehicle 10 and detects the transponder 50 within a predetermined range of distance, such as eight feet. The controller 54 is coupled to the proximity sensor 52 and a locking device 56 for the vehicle door 12, 14. The controller 54 actuates the locking device 56 to unlock the vehicle door 12, 14 when the proximity sensor 52 detects the transponder 50 within the predetermined range of distance. Also, the controller 54 actuates the LED 26 to emit a predetermined color, e.g. green, to indicate that the vehicle door 12, 14 is unlocked.

The door lock system 44 includes a lock sensor 55, the controller 54, and the door handle 16, 16'. The lock sensor 55 is integrated within the vehicle door 12, 14 and detects when the vehicle door 12, 14 is locked. The controller 54 is integrated within the vehicle 10 and is coupled to the lock sensor 55. The controller 54 actuates the LED 26 to emit a predetermined color, e.g. red, to indicate that the vehicle door 12,14 is locked.

The turning signal system 46 includes a turning signal arm 24, the controller 54, and the door handles 16, 16'. The turning signal arm 57 is attached to a steering column (not shown) of the vehicle and coupled to the controller 54. The controller actuates the LED 26 to intermittently emit a predetermined color, e.g. amber, in sync with a headlamp turning signal 59 so as to indicate that the vehicle 10 is turning.

The running light system 48 includes a sensor 60, the controller 54, and the door handles 16, 16'. The sensor 60 is attached to the engine (not shown) of the vehicle 10 and detects when the engine is running. The controller 54 is coupled to the sensor 60 and actuates the LED 26 to steadily emit a constant predetermined color, e.g. amber, to indicate that the engine is running.

While particular embodiments of the invention have been shown and described, it will be understood, of course, that the invention is not limited thereto since modifications may be made by those skilled in the art, particularly in light of the foregoing teachings. Accordingly, it is intended that the invention be limited only in terms of the appended claims.

What is claimed is:

1. An illuminated door handle for a vehicle door, comprising:
   An illuminated door handle for a vehicle door, comprising:
   a mounting frame;
   a handle arm pivotally attached to said mounting frame;
   said handle arm having at least one window portion and defining a cavity;
   an light emitting diode (LED) light guide extending into said cavity;
   a multicolor LED emitting a plurality of colors indicating a plurality of vehicle conditions;
   a back plate attached to said handle arm and extending across said cavity and including at least one light port;
   said multicolor LED attached to said LED light guide and transmitting light through said window portion of said handle arm and at least one light port of said back plate simultaneously;
   wherein said light through the at least one light port emits onto said outboard surface of said mounting frame;
   an uneven textured surface disposed on said at least one light port of the back plate for providing friction for opening said vehicle door; and
   a sensor detecting when an engine for said vehicle is running; and
   a controller coupled to said sensor and actuating said LED to emit a predetermined color to indicate that said engine is running.

2. A passive entry system for a vehicle, comprising:
   a vehicle door;
   an illuminated door handle attached to said vehicle door, comprising:
   a mounting frame;
   a handle arm pivotally attached to said mounting frame;
   said handle arm having at least one window portion and defining a cavity;
   a light emitting diode (LED) light guide extending into said cavity;
   a back plate attached to said handle arm and extending across said cavity; and
   an LED attached to said LED light guide and transmitting light through said window portion of said handle arm and at least one light port of said back plate simultaneously;
   an uneven textured surface disposed on said at least one light port for providing friction for opening said vehicle door; and
   a transponder;
   a proximity sensor detecting said transponder within a predetermined range of distance;
   a controller coupled to said proximity sensor and a locking device for said vehicle door;
   said controller actuating said locking device to unlock said vehicle door when said proximity sensor detects said transponder within said predetermined range of distance;
   said controller actuating said LED to emit a predetermined color to indicate that said vehicle door is unlocked.

3. A running light system for a vehicle, comprising:
   said illuminated door handle recited in claim 2;
   a sensor detecting when an engine for said vehicle is running;
   a controller coupled to said sensor and actuating said LED to emit a predetermined color to indicate that said engine is running.

* * * * *